United States Patent
Tsai et al.

(10) Patent No.: US 11,643,185 B2
(45) Date of Patent: May 9, 2023

(54) TRACK OVER-TRAVEL ARRESTMENT MECHANISM

(71) Applicant: The Boeing Company, Chicago, IL (US)

(72) Inventors: Kevin R. Tsai, Seattle, WA (US); Bryan J. Gruner, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 852 days.

(21) Appl. No.: 16/355,522

(22) Filed: Mar. 15, 2019

(65) Prior Publication Data
US 2020/0290723 A1    Sep. 17, 2020

(51) Int. Cl.
*B64C 9/20* (2006.01)
*B64C 13/28* (2006.01)
*B64C 9/02* (2006.01)

(52) U.S. Cl.
CPC .................. *B64C 9/20* (2013.01); *B64C 9/02* (2013.01); *B64C 13/28* (2013.01)

(58) Field of Classification Search
CPC .............. B64C 9/20; B64C 9/02; B64C 13/28
See application file for complete search history.

(56) References Cited

U.S. PATENT DOCUMENTS

| 2,836,380 A * | 5/1958 | Pearson | B64C 9/20 |
| | | | 244/216 |
| 7,316,370 B2 * | 1/2008 | Sankovic | F42B 10/64 |
| | | | 244/3.27 |
| 2014/0145039 A1 * | 5/2014 | Beyer | B64C 9/02 |
| | | | 244/99.3 |
| 2019/0112029 A1 * | 4/2019 | Turner | B64C 3/50 |

* cited by examiner

*Primary Examiner* — Richard R. Green
*Assistant Examiner* — Steven J Shur
(74) *Attorney, Agent, or Firm* — Felix L. Fischer

(57) ABSTRACT

A system to arrest flap over-travel employs a track engaging a flap to a support structure. The track has a deployment profile determining flap motion relative to the support structure during travel between an extended position and a normal retracted position. The deployment profile has a transition portion extending beyond the normal retracted position and terminating in a detent. A resiliently mounted catcher is configured to be displaced by the transition portion during over-travel of the flap beyond the normal retracted position and captured in the detent in a maximum retracted position thereby restraining the flap.

20 Claims, 14 Drawing Sheets

TRACK OVER-TRAVEL ARRESTMENT MECHANISM

REFERENCE TO RELATED APPLICATIONS

This application is with U.S. application Ser. No. 16/355,478 filed concurrently herewith entitled TRACK OVER-TRAVEL ARRESTMENT MECHANISM FOR AUXILIARY SUPPORT and issued as U.S. Pat. No. 11,208,195 on Dec. 28, 2021.

BACKGROUND INFORMATION

Field

Embodiments of the disclosure relate generally to the field of aircraft flap extension systems and, more particularly to a mechanism at a main flap support for arresting over-travel in a trailing edge flap.

Background

Aircraft employ flaps which increase camber of the wings for enhanced aerodynamic efficiency in take-off and landing. Various mechanical arrangements have been developed to deploy the flaps over a range of retracted to extended positions. Flaps in the retracted position may extend forward into the trailing edge cove of the wing structure in certain over-travel situations. If primary load paths are not available, air load may deflect the flap further forward into the cove, which may create unintentional contact between parts. Maintaining a controlled flap position in the event of an over-travel condition is desirable to avoid flutter.

SUMMARY

Exemplary embodiments provide a system to arrest flap over-travel employing a track engaging a flap to a support structure. The track has a deployment profile determining flap motion relative to the support structure during travel between an extended position and a normal retracted position. The deployment profile has a transition portion extending beyond the normal retracted position and terminating in a detent. A resilient catcher is configured to be displaced by the transition portion during over-travel of the flap beyond the normal retracted position and captured in the detent in a maximum retracted position thereby restraining the flap.

The implementations herein provide a method for arresting flap over-travel wherein a flap is engaged to a track having a deployment profile determining flap motion relative to a support structure during travel between an extended position and a normal retracted position. The deployment profile has a transition portion extending beyond the normal retracted position. A resiliently mounted catcher is displaced in the transition portion of the deployment profile during over-travel of the flap beyond the normal retracted position. The resiliently mounted catcher is captured in a detent at a termination of the transition portion in a maximum retracted position thereby restraining the flap.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

Figure 1:
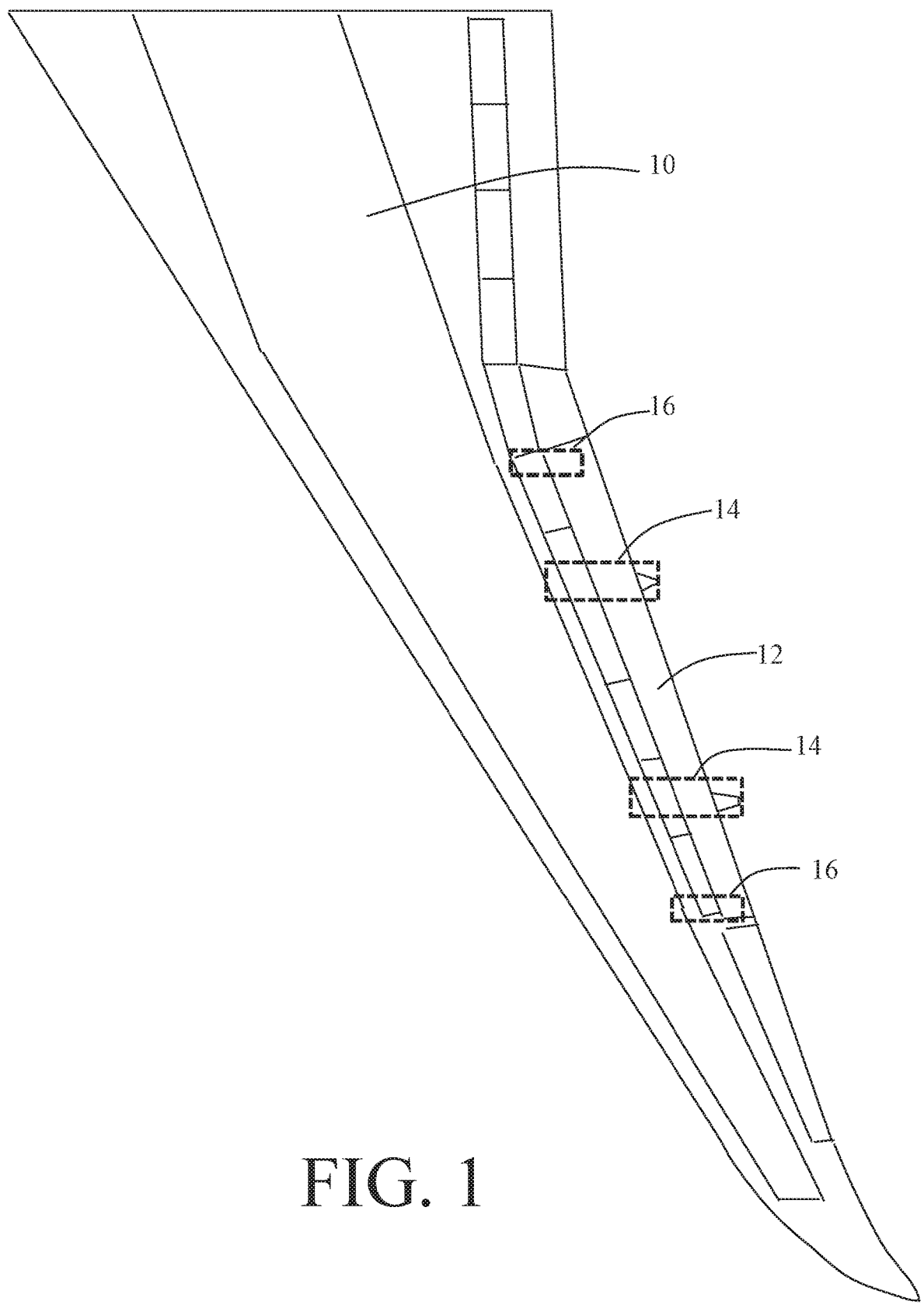
FIG. 1 is a representation of an aircraft wing in which the implementations disclosed herein may be employed.

The implementations described herein provide a system to arrest flap over-travel at both flap main and auxiliary supports. A track engages a flap to a support structure. The track has a deployment profile determining flap motion relative to the support structure during travel between an extended position and a normal retracted position. The deployment profile includes a transition portion extending beyond the normal retracted position and terminating in a detent. A resilient catcher is configured to be displaced by the transition portion during over-travel of the flap beyond the normal retracted position and captured in the detent in a maximum retracted position. Referring to the drawings, FIG. 1 shows an aircraft wing 10 having an example flap 12 mounted at main flap supports 14 and auxiliary supports 16. While the example flap 12 is depicted as an outboard flap the implementations herein are applicable to any flap configuration. The main flap supports 14 define the motion of the flap 12 and provide actuators to extend and retract the flap as well as a primary load path to react aerodynamic loads on the flap. The auxiliary supports 16 include deflection control and provide additional support for the flap over the range of motion. The auxiliary supports provide alternate load paths in the event primary load paths are not available.

Figure 2:
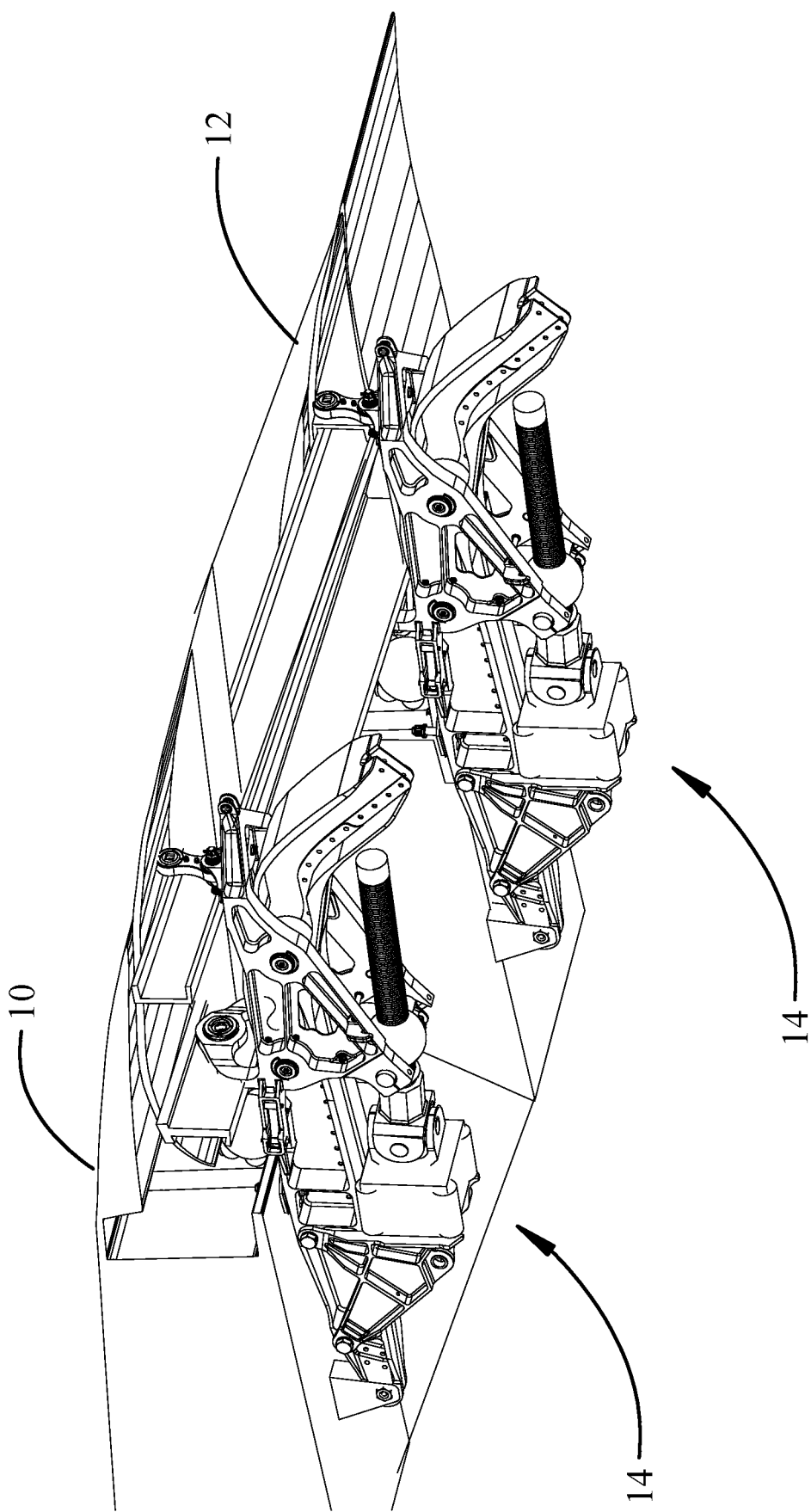
FIG. 2 is a pictorial representation of an exemplary implementation for a main flap support and actuation location.
Figure 3:
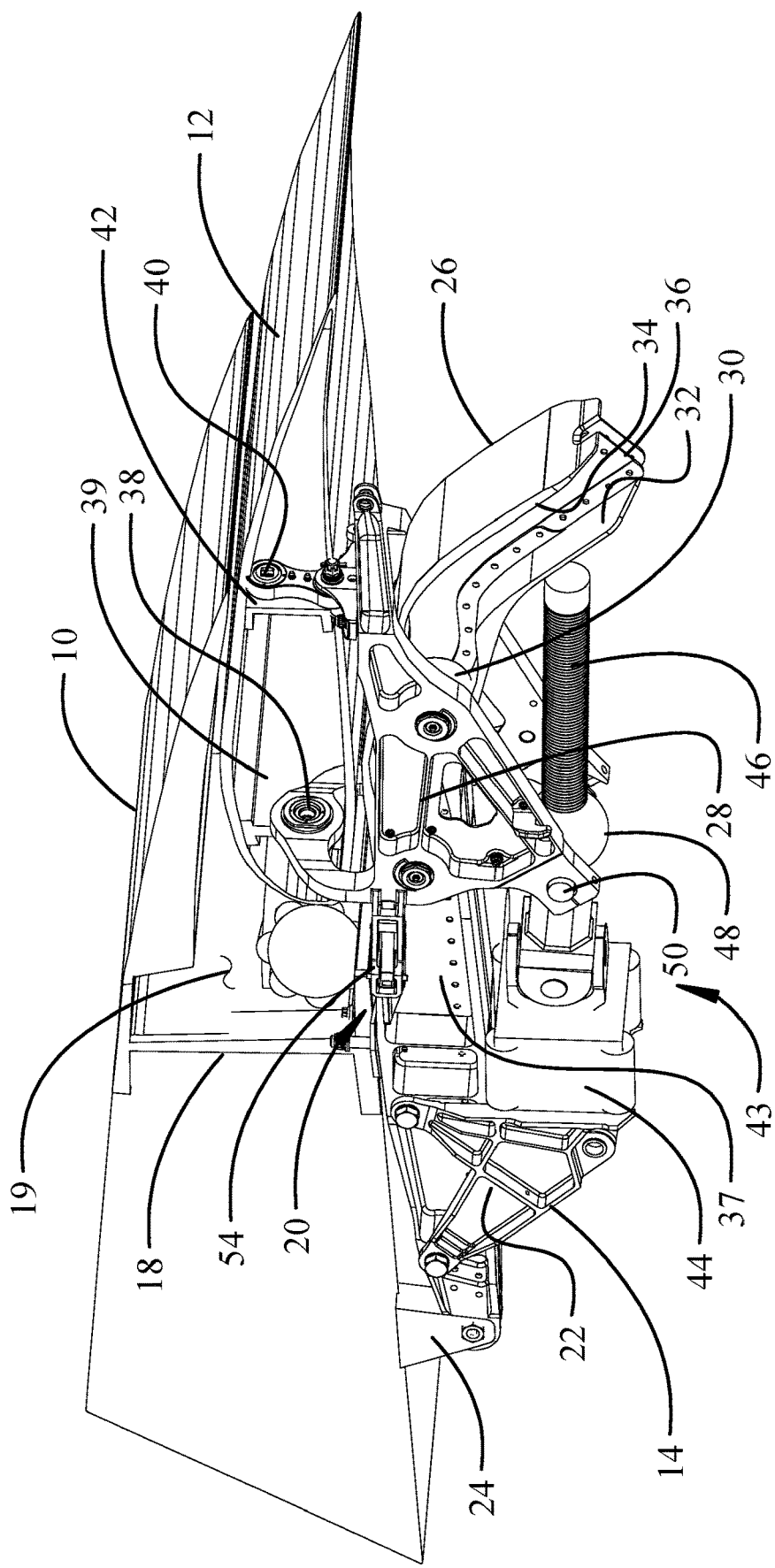
FIG. 3 is a detail pictorial representation of the engagement elements of the exemplary implementation.

An exemplary implementation of a flap over-travel arrest system 20 for use at the main flap supports 14 is shown in FIG. 2 with support cowlings removed for clarity. As seen in FIG. 3, the main flap support 14 has an engagement element 22 which structurally engages the wing 10, in the exemplary implementation, at the rear spar 18 and at a forward trunnion 24. A track 26 extends the main flap support 14 aft from the engagement element 22. The flap 12 has a structure including a carriage 28 with primary air load rollers 30 received in the track 26. The track 26 has a deployment profile, created by a curved lower flange 32, a curved upper flange 34 and a rib 36 providing a lateral wall 37, which determines the positioning of the flap 12 over a range of motion from a fully retracted to a fully extended position. For the exemplary embodiment, the track 26 has mirrored upper and lower flanges on each side of the rib 36 to receive inboard and outboard primary air load rollers 30 on the carriage 28 (best seen in FIGS. 5A-5D). The carriage 28 incorporates a forward mounting boss 38 attached to a D-spar or forward spar 39 in the flap 12 and an aft mounting boss 40 attached to an aft spar 42 or similar portions of the flap structure. A flap actuator 43 incorporates an actuator motor 44 mounted to the engagement element 22 which drives the carriage 28 with a jack screw 46 received in a ball nut 48 carried by axles 50 in the carriage. A universal joint 52 connects the actuator motor 44 and jack screw 46 to accommodate alignment changes as the carriage 28 translates on the track 26.

Figure 4:
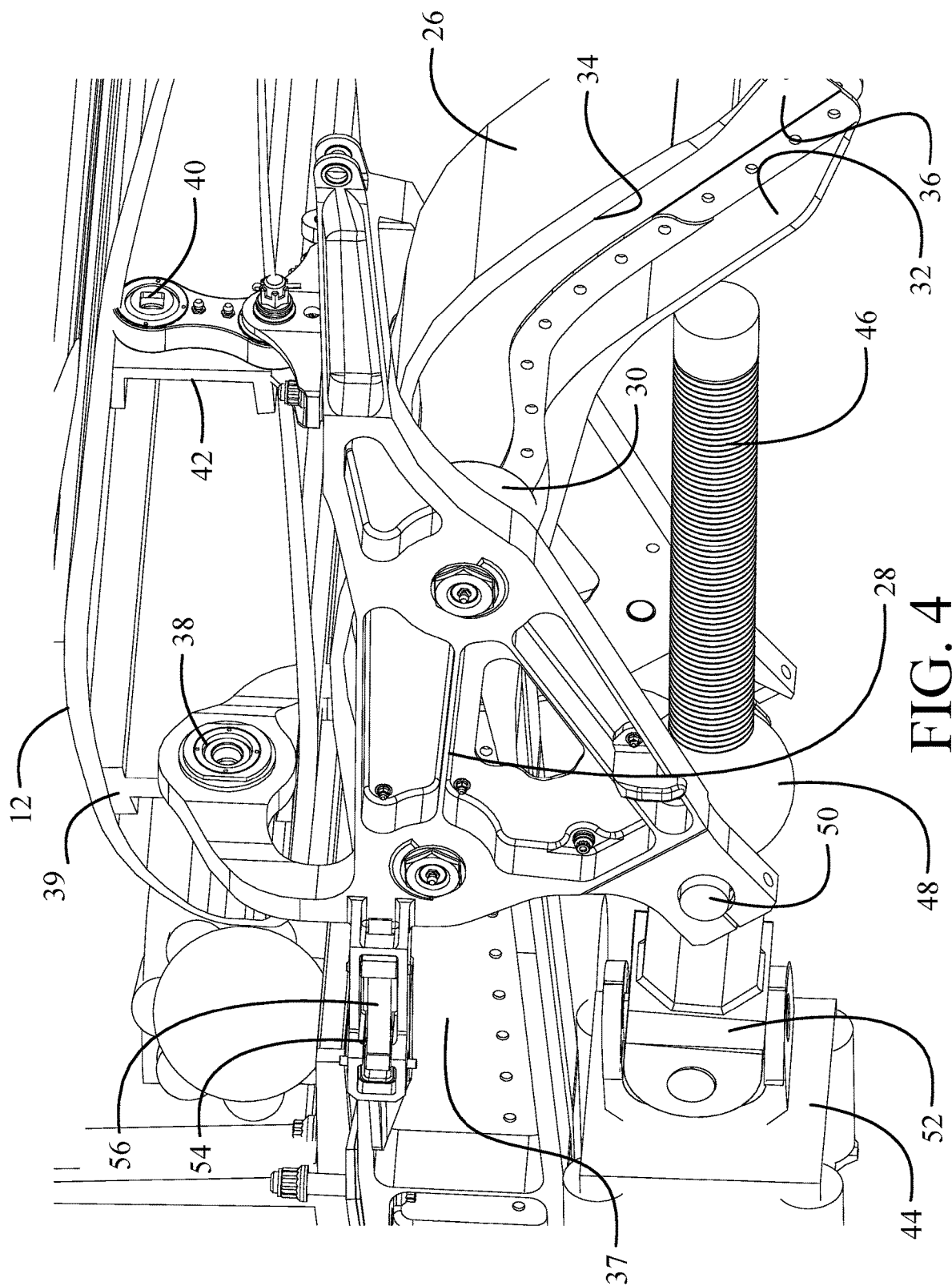
FIG. 4 is detail pictorial representation of the support mounted flap track and flap carriage for the exemplary implementation.

As seen in detail in FIG. 4, a catcher assembly 54 extends forward from the carriage 28. A resilient catcher 56 is mounted in the catcher assembly 54, as will be described in greater detail subsequently. In the exemplary implementation the catcher assembly is mirrored on each side of the carriage 28.

Figure 5A:
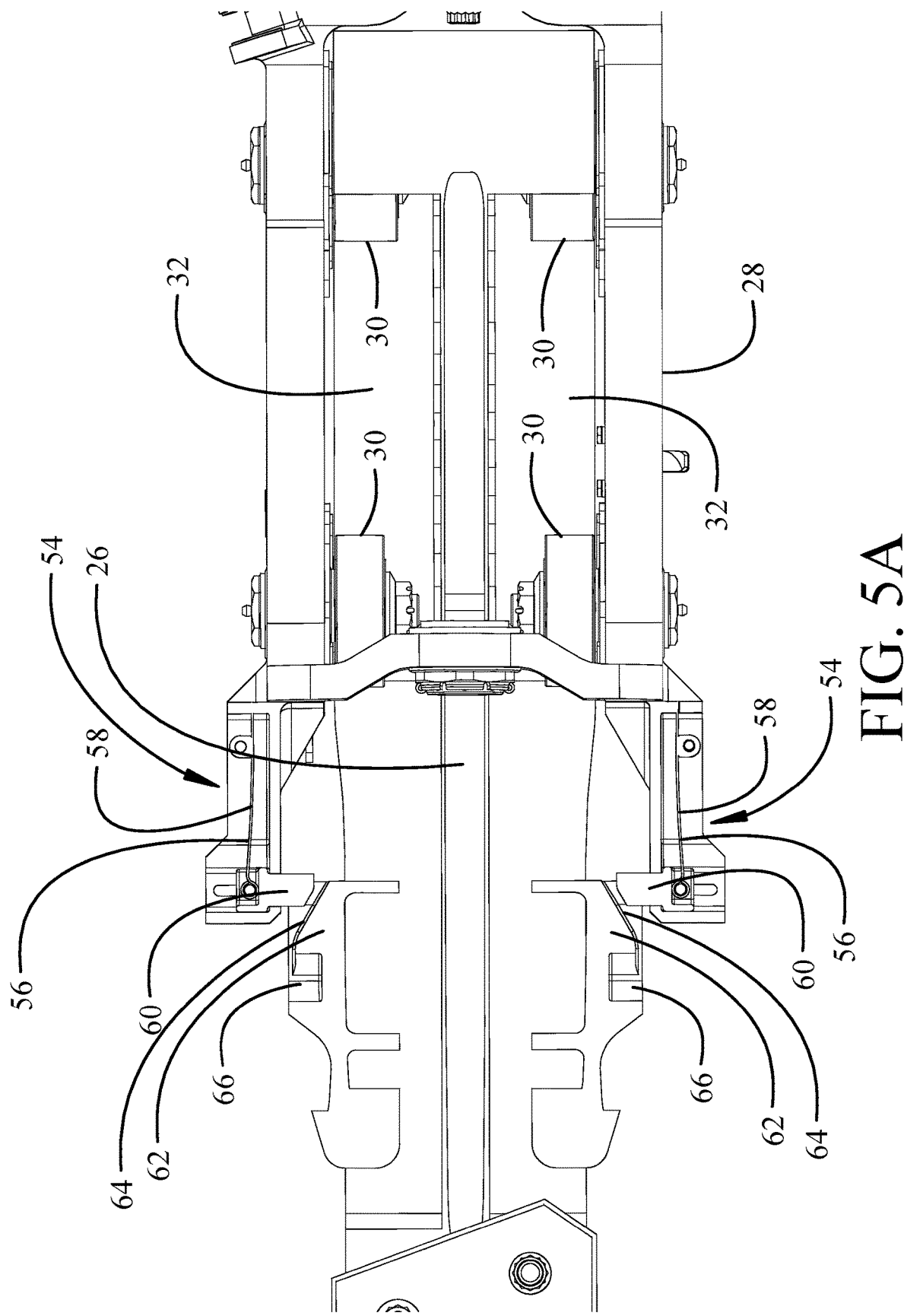
FIGS. 5A-5D are detailed top views of the elements of the first exemplary implementation in a normal retracted position, deflection limit position, over-travel position and captured position.

FIG. 5A shows details of the mirrored catcher assemblies 54. For one exemplary implementation, the catcher 56 has a resilient capture arm 58 which terminates in a pin 60. In the implementation shown the capture arm 58 is a leaf spring providing resilience for the capture arm 58 and pin 60 to reciprocate in a lateral direction. In alternative embodiments, as will be described, the capture arm is pivotally mounted with a torsion spring or similar device for resilience. In FIG. 5A, the carriage 28 and flap are in a normal retracted position. As previously described, the track 26 has a deployment profile for controlling position of the carriage 28 and flap 12. The primary air load rollers 30 are constrained by the lower flange 32 and upper flange 34 to provide the desired flap configuration when positioned by the actuator motor 44 and jack screw 46. In the exemplary implementation, the deployment profile of the track 26 includes lateral walls 37 on the rib 36 (seen in FIG. 4) and has a transition portion 62 extending beyond the normal retracted position of the flap 12 and carriage 28. For the implementation as shown in FIG. 5A, the transition portion 62 has a ramp 64 extending from the lateral wall 37. The transition portion 62 terminates in a detent 66 sized to receive the pin 60, as will be described in greater detail subsequently.

Figure 5B:
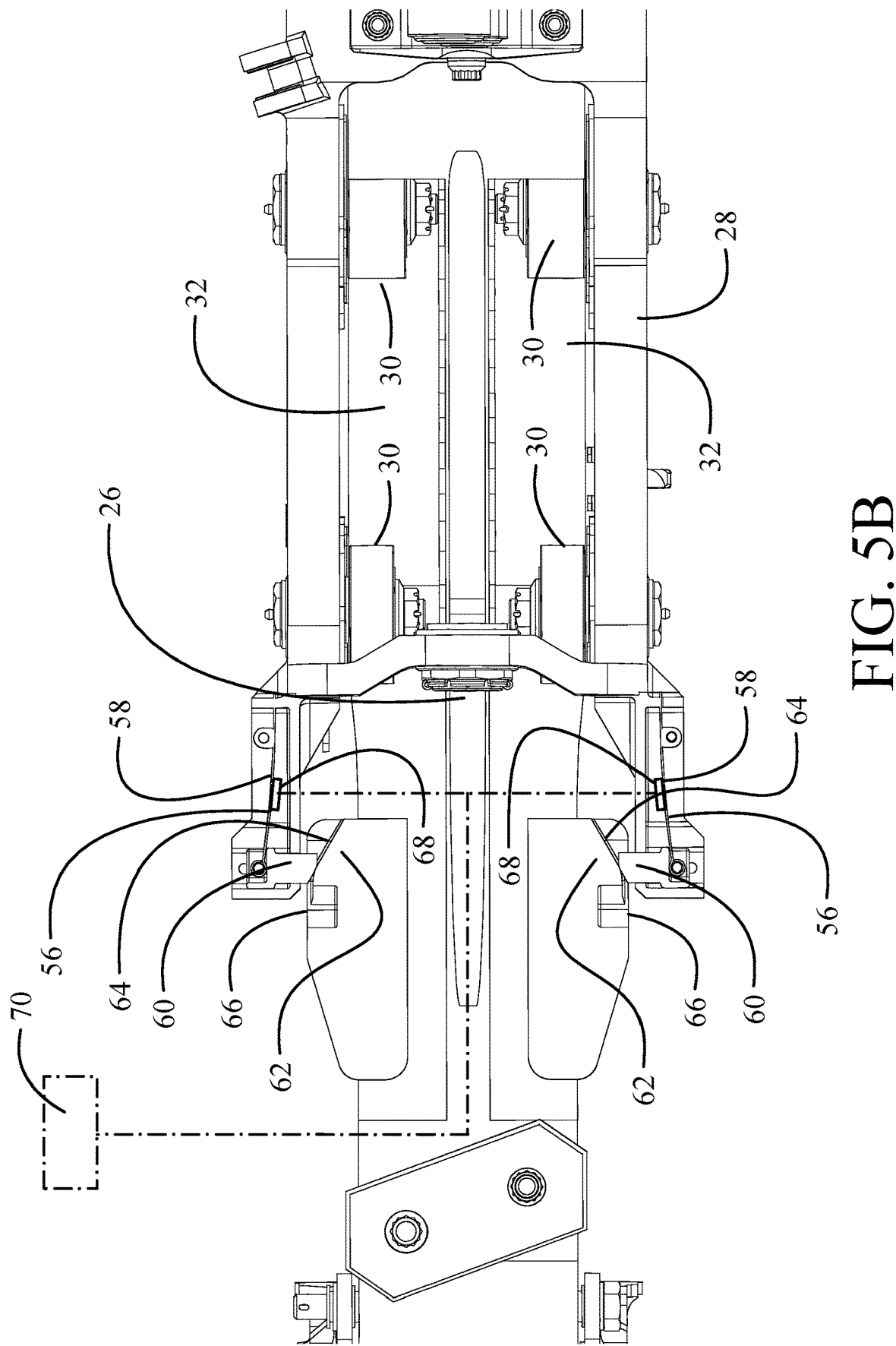
Figure 5C:
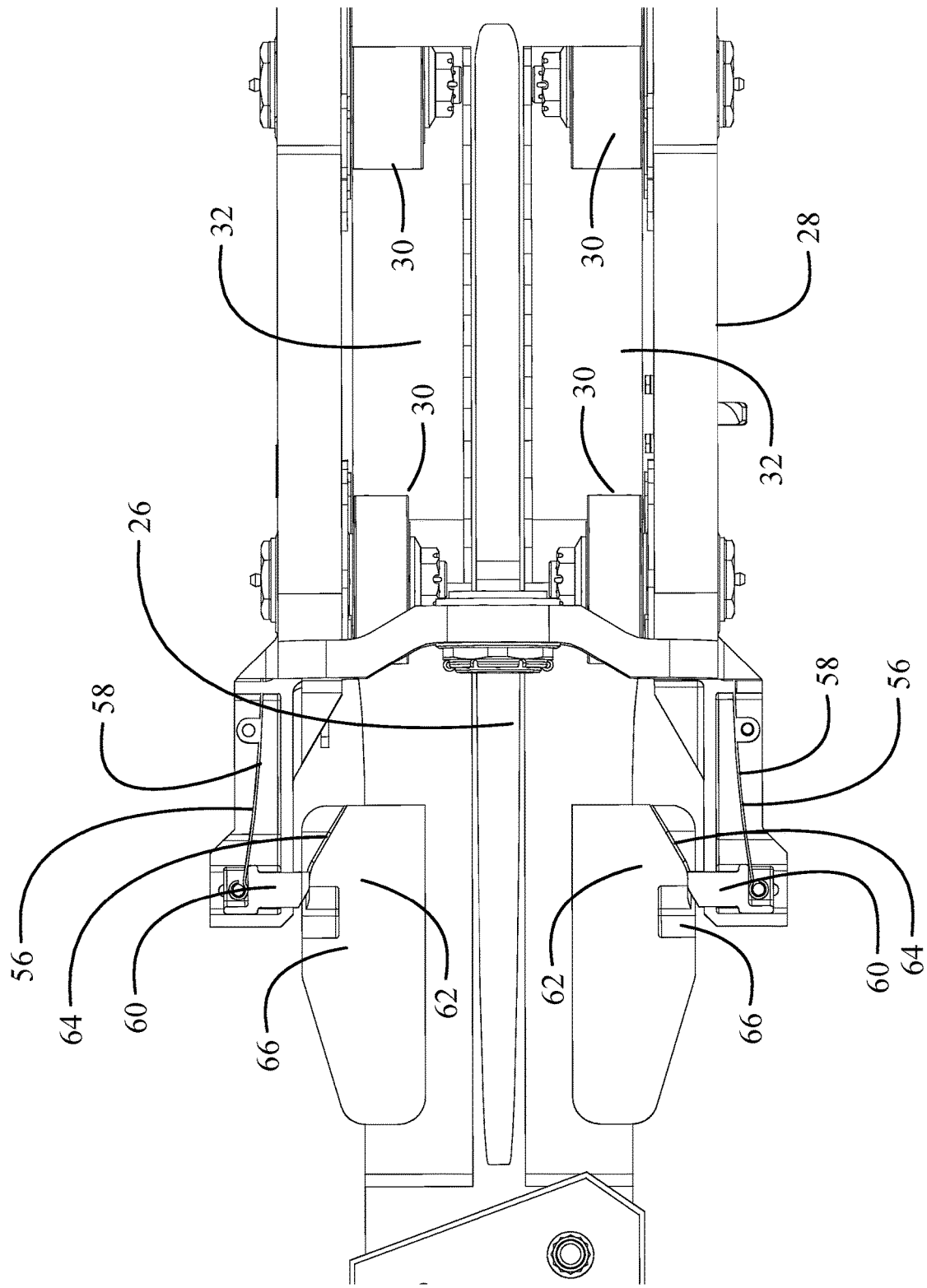
Figure 5D:
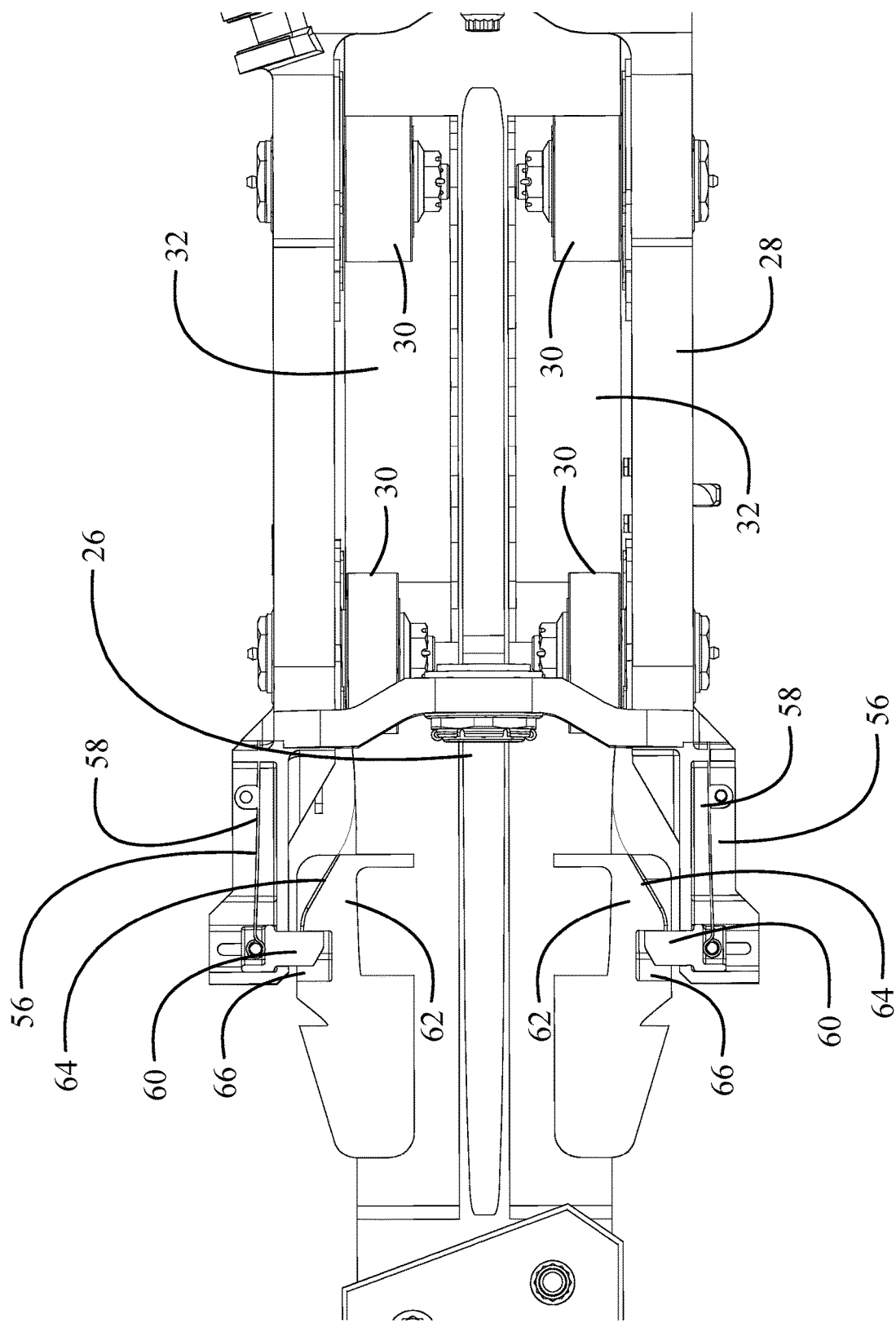

In certain conditions, over-travel of the flap beyond the normal retracted position could allow elements of the flap 12 to intrude into the cove 19 (seen in FIG. 3). The catcher assembly 54 and transition portion 62 of the track 25 determine a maximum over-travel position of the flap by engaging the pin 60 of the catcher 56 in the detent 66 locking the flap 12 to prevent further over-travel. As seen in FIG. 5B, as the carriage 28 travels forward past the normal retracted position the pin 60 of the catcher 56 engages the ramp 64 of the transition portion 62 of the track profile and resiliently urges the capture arm 58 laterally outward, as indicated by arrow 67, relative to the direction of travel of the flap. A sensor such as a strain gage 68 on capture arm 58 is employed to provide a signal to a control system 70 (shown in phantom) to report an over-travel condition. Continued forward over-travel of the flap 12 reaches a deflection limit as shown in FIG. 5C where the pin 60 of catcher 56 reaches the end of the ramp 64 in the transition portion 62 and, if further continued as seen in FIG. 5D, pin 60 is laterally displaced inwardly by resilient capture arm 58 being received in the detent 66 capturing the catcher 56. The pin 60 locks the catcher 56 securing the carriage 28 and flap 12.

Figure 6A:
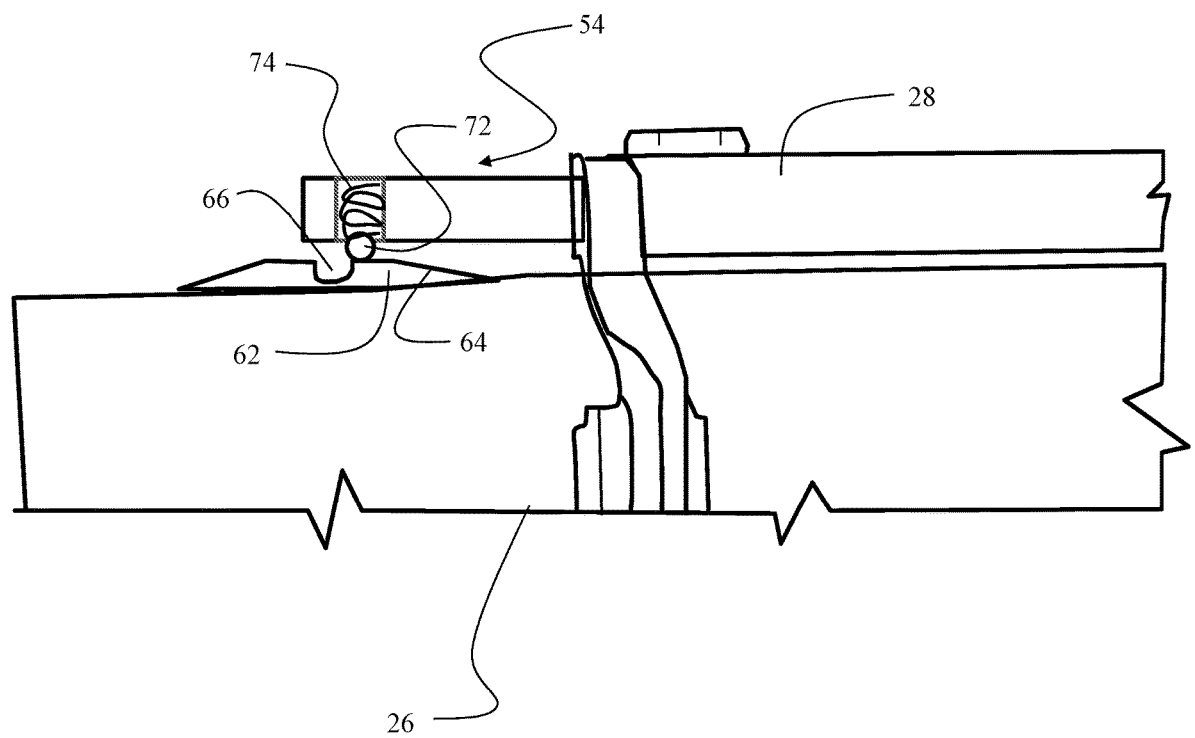
FIGS. 6A and 6B are top and pictorial views of a second configuration of the resilient catcher in the deflection limit and over-travel positions.
Figure 6B:
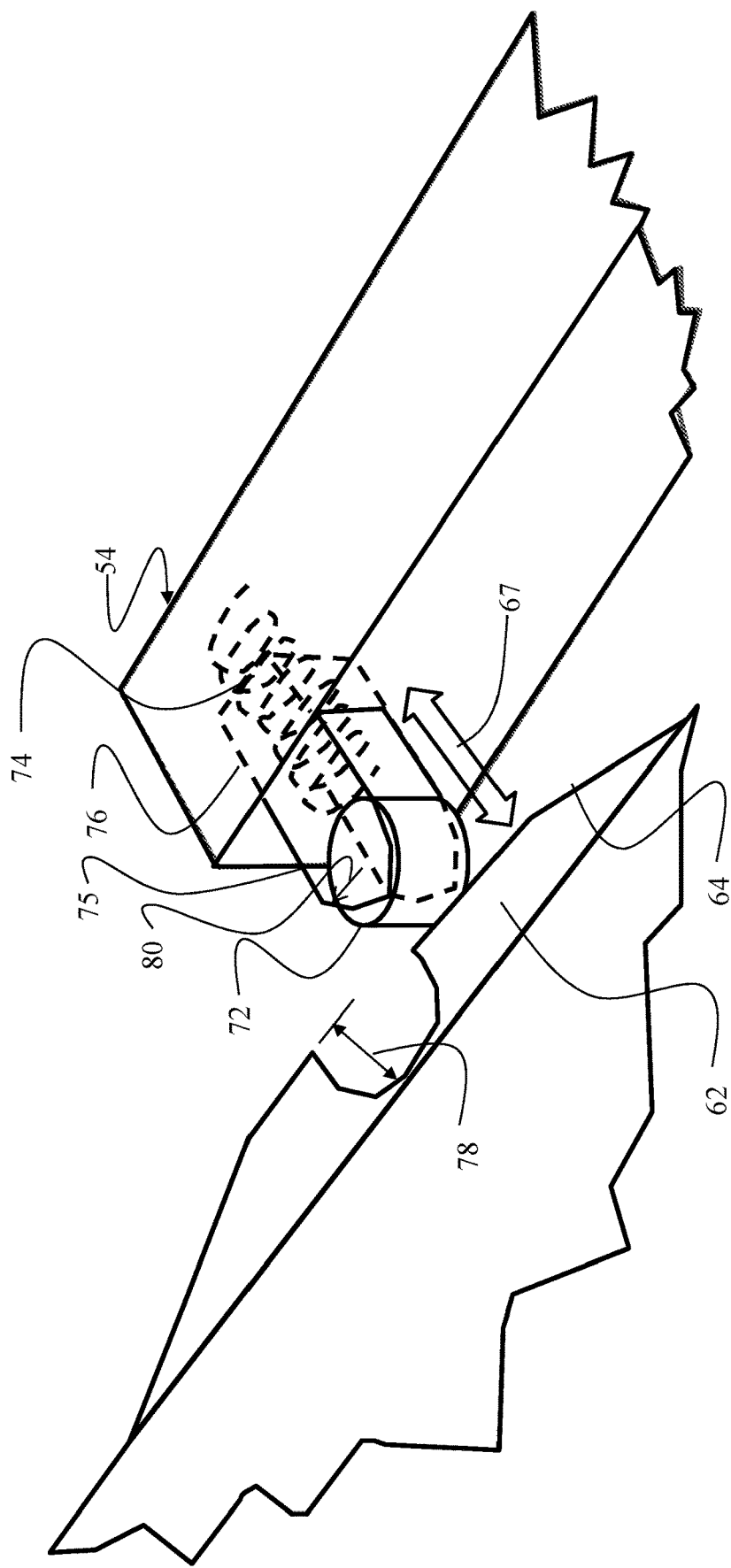

Alternative configurations of the catcher are employed for alternative flap system designs and requirements. A second configuration of the catcher assembly 54 is shown in FIGS. 6A and 6B. In the second configuration, the catcher 56 is a catcher roller 72, resiliently mounted with a spring 74, to be displaced by contact with the ramp 64 of the transition portion 62. As seen in FIG. 6B, the catcher roller 72 is supported in a stirrup 75 received in a cavity 76 and engaging the spring 74 for controlled lateral reciprocation of the catcher roller with respect to direction of travel of the flap 12. Upon reaching the maximum over-travel position, the catcher roller 72 is captured in the detent 66. The detent 66 has a depth 78 which is greater than a radius 80 of the catcher roller 72 to ensure that the catcher roller cannot escape the detent once captured.

Figure 7A:
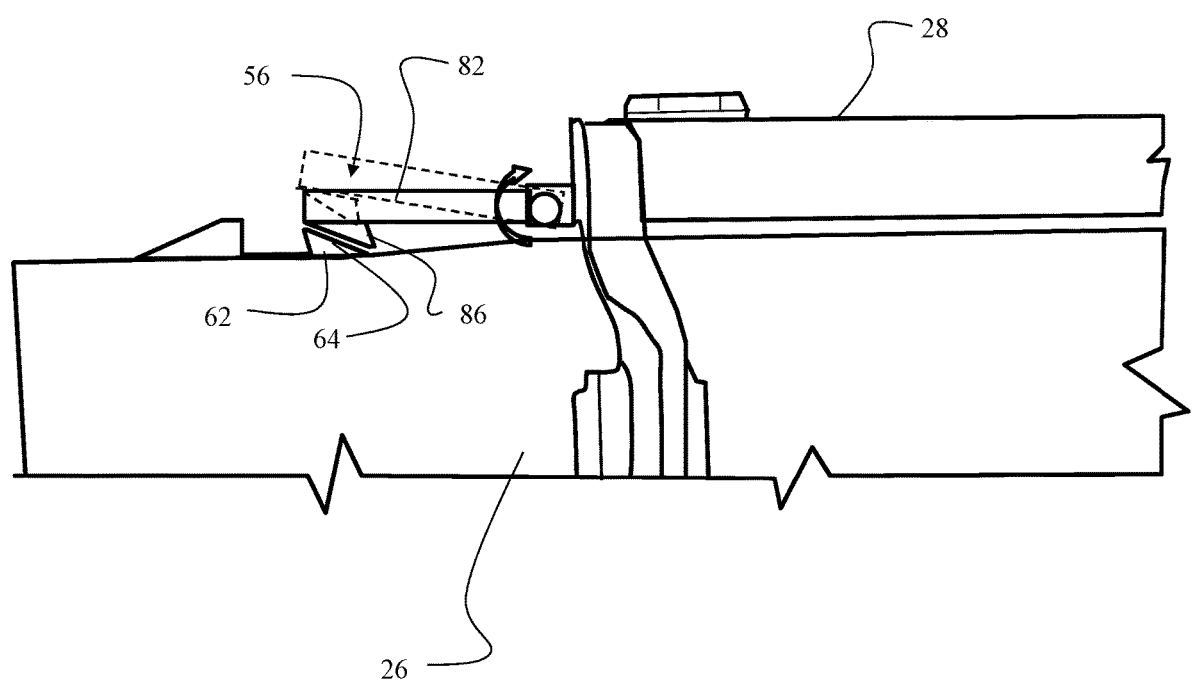
FIGS. 7A and 7B are top and pictorial views of a third configuration of the resilient catcher in the deflection limit and over-travel positions.
Figure 7B:
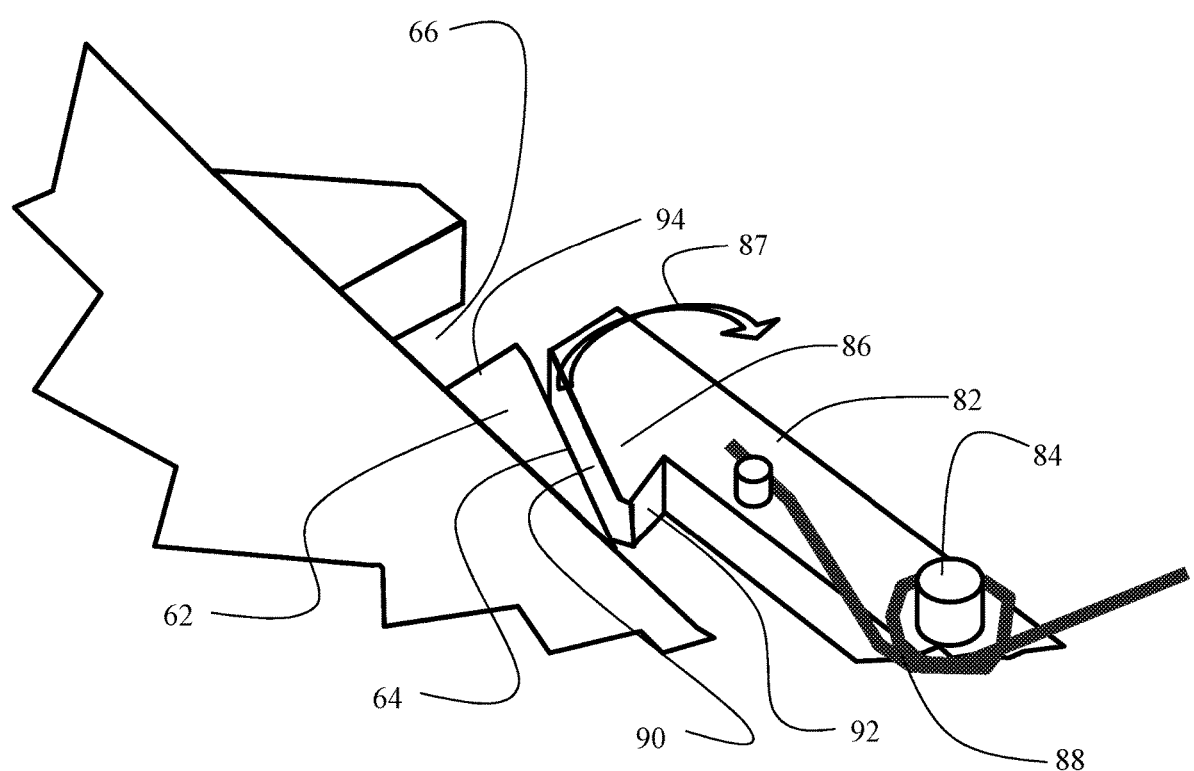

A third configuration is shown in FIGS. 7A and 7B. In the third configuration, the catcher 56 employs a capture arm 82, which is pivotally mounted with an axle 84 to be resiliently rotatable, and a barb 86 laterally extending from the capture arm 82. A torsion spring 88 engaged to the capture arm 82 resiliently urges a sliding surface 90 of the barb 86 against the ramp 64 but allows lateral outward displacement (arrow 87) as the over-travel urges the catcher onto the transition portion 62 (shown in phantom in FIG. 7A). Upon reaching the maximum over-travel position, the barb 86 is captured in the detent 66. For the configuration shown, the barb 86 includes an undercut engagement face 92 which is captured by a mating undercut receiving face 94 in the detent 66 to resist disengagement.

Figure 8:
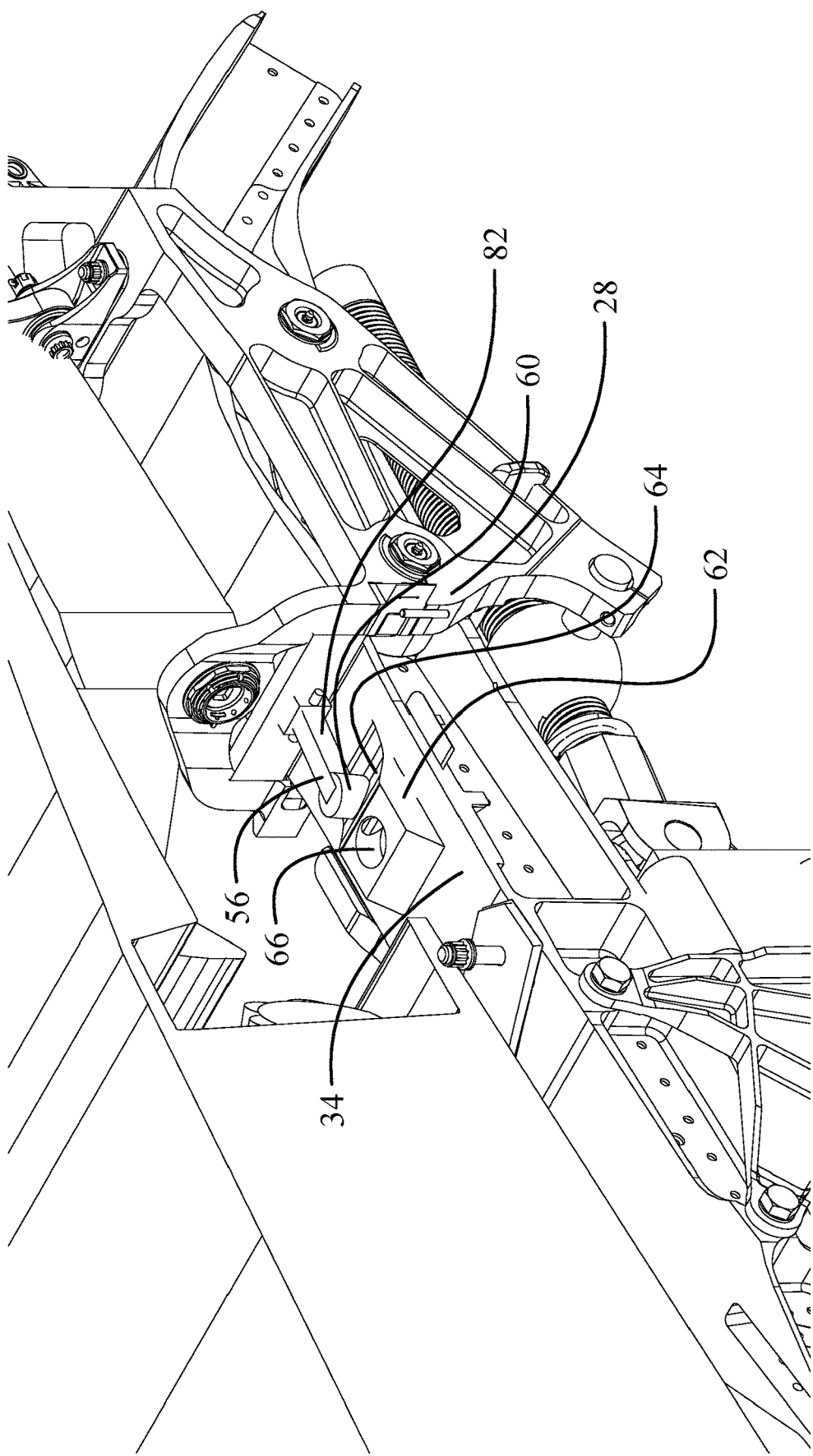
FIG. 8 is a pictorial view of an alternative implementation with vertical displacement of the catcher; and, FIG. 9 is a flowchart of a method for arresting flap over-travel employing the exemplary implementation.

While in the implementations previously described the catcher 56 laterally reciprocates when displaced by the transition portion 62, alternative implementations may position the transition portion 62 on the track deployment profile for vertical reciprocation of the resilient catcher relative to the direction of motion of the flap 12 as shown in FIG. 8. The transition portion 62 extends from the top of the upper flange 34. Catcher 56 employs a capture arm 82 resiliently pivotally mounted to the carriage 28. A pin 60 engages and is vertically displaced upward by the ramp 64 during over-travel and is captured in the detent 66 at the maximum retracted position. Mirrored catchers on the upper or lower flanges may also be employed.

Figure 9:
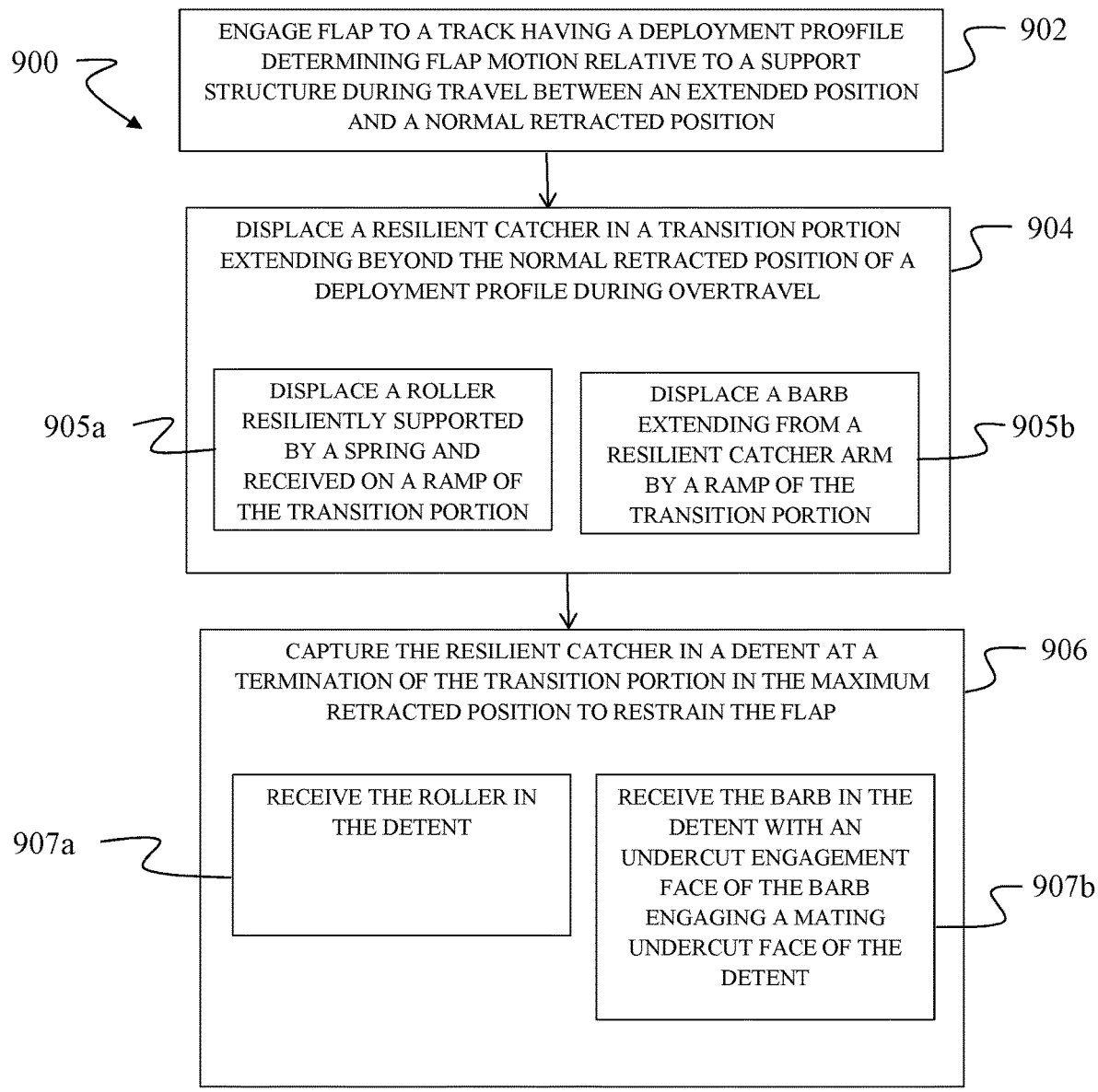

The implementations described herein provide a method 900 for arresting flap over-travel, as shown in FIG. 9. A flap 12 is engaged to a track 26 having a deployment profile determining flap motion relative to the structure of a main flap support 14 during travel between an extended position and a normal retracted position, step 902. The deployment profile has a transition portion 62 extending beyond the normal retracted position. A resilient catcher 56 is displaced in the transition portion 62 of the deployment profile during over-travel of the flap 12 beyond the normal retracted position, step 904. The catcher 56 employs, in one alternative, a catcher roller 72 is resiliently mounted with a spring 74 and the catcher roller is received on a ramp 64 of the transition portion 62 to be displaced, step 905a. In a second alternative, a barb 86 extending from a resilient capture arm 82 is received on the transition portion 62 and displaced by the ramp 64, step 905b. The resilient catcher 56 is captured in a detent 66 at a termination of the transition portion 62 in a maximum retracted position thereby restraining the flap, step 906. In the first alternative, the catcher roller 72 is received in the detent 66, step 907a. In the second alternative, the barb 86 is received in the detent 66 with an undercut engagement face 92 of the barb engaging a mating undercut receiving face 94 of the detent 66, step 907b.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A system to arrest flap over-travel comprising:
a track engaging a flap to a support structure, the track having a curved lower flange and a curved upper flange creating a deployment profile determining flap motion relative to the support structure during travel between an extended position and a normal retracted position, said deployment profile further having a transition portion of the curved lower flange and curved upper flange extending beyond the normal retracted position and terminating in a detent in one of the curved lower flange or the curved upper flange; and
a resilient catcher configured to be displaced by one of the curved lower flange or the curved upper flange in the transition portion during over-travel of the flap beyond the normal retracted position and captured in the detent in a maximum retracted position thereby restraining the flap.

2. The system as defined in claim 1 wherein the catcher is mounted to a flap structure.

3. The system as defined in claim 1 wherein the catcher reciprocates laterally relative to a direction of travel of the flap.

4. The system as defined in claim 1 wherein the catcher reciprocates vertically relative to a direction of travel of the flap.

5. The system as defined in claim 1 wherein the track is attached to an engagement element of the support structure.

6. The system as defined in claim 5 wherein the flap includes a carriage engaged to the track.

7. The system as defined in claim 6 wherein the carriage has at least one air load roller constrained by the track.

8. The system as defined in claim 7 wherein the track further has a lateral wall, wherein said at least one air load roller is constrained by the curved upper flange and the curved lower flange to provide desired flap configuration when positioned by an actuator.

9. The system as defined in claim 8 wherein the catcher comprises a catcher roller resiliently mounted to the carriage and the transition portion includes a ramp mounted to the lateral wall.

10. The system as defined in claim 9 wherein the detent has a depth greater than a radius of the catcher roller.

11. The system as defined in claim 7 wherein the catcher comprises a capture arm resiliently rotatable on the carriage, said capture arm having a barb extending laterally to be received in the detent.

12. The system as defined in claim 11 wherein the detent and the barb are undercut thereby preventing disengagement.

13. The system as defined in claim 8 wherein the catcher comprises a resilient capture arm having a pin extending laterally for engagement of the transition portion and detent.

14. The system as defined in claim 12 wherein the capture arm is a leaf spring.

15. The system as defined in claim 1 wherein
the flap includes a carriage having at least one primary air load roller and the track has a lateral wall, said at least one primary air load roller constrained by the curved upper flange and the curved lower flange to provide desired flap configuration when positioned by an actuator;
the transition portion includes a ramp mounted to the lateral wall; and
the catcher comprises a pin resiliently mounted to the carriage with a leaf spring, said pin engaging the ramp during over-travel to reciprocate laterally and captured in the detent at the maximum retracted position.

16. The system as defined in claim 1 wherein
the flap includes a carriage having at least one primary air load roller and the track has a lateral wall, said at least one primary air load roller constrained by the curved upper flange and the curved lower flange to provide desired flap configuration when positioned by an actuator;
the transition portion includes a ramp mounted to the lateral wall; and
the catcher comprises a capture arm resiliently rotatable on the carriage, said capture arm having a barb, said barb engaging the ramp during over-travel to reciprocate laterally and captured in the detent at the maximum retracted position with an undercut engagement face of the barb captured by mating undercut receiving face in the detent thereby resisting disengagement.

17. A system to arrest flap over-travel comprising:
a flap having a carriage with at least one primary air load roller;
a support structure having a track receiving the at least one primary air load roller, the track having a curved lower flange and a curved upper flange create a deployment profile determining flap motion relative to the support structure during travel between an extended position and a normal retracted position, said deployment profile further having a transition portion of the curved lower flange and curved upper flange extending beyond the normal retracted position and terminating in a detent; and,
a catcher roller resiliently mounted to the carriage and displaced laterally with respect to direction of travel of the flap by a ramp on one of the curved lower flange or the curved upper flange in the transition portion during over-travel of the flap beyond the normal retracted position and captured in the detent in a maximum retracted position thereby restraining the flap, the detent having a depth greater than a radius of the catcher roller thereby preventing disengagement.

18. A method for arresting flap over-travel, the method comprising:
engaging a flap to a track having a curved lower flange, a curved upper flange creating a deployment profile determining flap motion relative to a support structure during travel between an extended position and a normal retracted position, said deployment profile further having a transition portion of the curved lower flange and curved upper flange extending beyond the normal retracted position;
displacing a resilient catcher by one of the curved lower flange or the curved upper flange in in the transition portion of the deployment profile during over-travel of the flap beyond the normal retracted position; and
capturing the resilient catcher in a detent in one of the curved lower flange or the curved upper flange in at a termination of the transition portion in a maximum retracted position thereby restraining the flap.

19. The method as defined in claim 18 wherein the step of displacing comprises receiving a resiliently mounted roller in the catcher on the transition portion and displacing the resiliently mounted roller and the step of capturing comprises receiving the resiliently mounted roller in the detent
.

20. The method as defined in claim 18 wherein the step of displacing comprises receiving a barb, said barb extending from a resilient capture arm, on the transition portion and laterally displacing the barb and resilient catcher arm and the step of capturing comprises receiving the barb in the detent with an undercut engagement receiving face of the barb engaging a mating undercut face of the detent.

\* \* \* \* \*